United States Patent [19]
Mitchell et al.

[11] 3,977,371
[45] Aug. 31, 1976

[54] THROTTLE MOTION INDICATOR DEVICE

[75] Inventors: Harry Ream Mitchell, Bloomfield Hills; Neil Arthur Schilke, Rochester, both of Mich.

[73] Assignee: General Motors Corporation, Detroit, Mich.

[22] Filed: June 19, 1975

[21] Appl. No.: 588,332

[52] U.S. Cl. .......................... 123/97 R; 123/198 D; 74/513; 180/105 R
[51] Int. Cl.² ......................................... F02D 39/00
[58] Field of Search .......... 123/97 R, 103 E, 198 D; 74/513, 514, 526, 180/105 R

[56] References Cited
UNITED STATES PATENTS

| | | | |
|---|---|---|---|
| 2,798,468 | 7/1957 | Heidner | 123/198 D X |
| 2,903,905 | 9/1959 | Rhode | 74/526 X |

*Primary Examiner*—Charles J. Myhre
*Assistant Examiner*—William C. Anderson
*Attorney, Agent, or Firm*—Arthur N. Krein

[57] ABSTRACT

A throttle motion indicator device for an internal combustion engine of a vehicle having an induction system including a movable throttle for controlling flow through an induction passage and, an operator actuated accelerator pedal linkage, including a throttle rod, operatively connected to the throttle for controlling movement thereof, the indicator device including a spring positioned roller carried by the throttle rod in position to engage a detent means suitably positioned in the path of the roller as carried by the throttle rod to indicate to the operator a throttle position for improved fuel economy. With this device, the driver depresses the accelerator pedal until he feels a slight stiffening in the throttle movements which alerts him that he has reached a predetermined limit in acceleration rate to obtain good fuel economy. In an alternate embodiment, the detent means carries two detents to provide a signal to the operator of a range of throttle positions within an optimum acceleration range.

6 Claims, 4 Drawing Figures

THROTTLE MOTION INDICATOR DEVICE

This invention relates to a throttle control for an automotive vehicle engine and, in particular, to a throttle motion indicator device useful to inform a vehicle operator of when he is operating the engine at a close-to-optimum acceleration or within an optimum acceleration range to attain good fuel economy.

Many automobile drivers operate the accelerator pedal much too rapidly during acceleration whereby the engine is not operated in the most economical manner. That is, the operator may effect a too rapid opening of the throttle valve which causes the manifold vacuum to drop below an efficient operating vacuum range.

In an effort to permit the average or unskilled driver to save fuel, various warning devices have been proposed which are operative, as a function of intake manifold vacuum, to provide a visual signal to the driver to indicate, for example, when the vehicle is not being operated in an economical manner but, such a signal must be observed by the driver to be effective. In addition, various throttle control devices have been proposed to compensate for the erratic or sudden operation of the accelerator pedal by the vehicle operator as, for example, by applying a force to resist opening movement of the throttle under certain engine operating conditions as a function of intake manifold vacuum, but in such known devices, this resistance force will increase proportionately with throttle opening movement and must continuously be overridden by the vehicle operator.

These above referred to prior art devices are normally operative as a function of intake manifold vacuum and are designed so as to attempt to maintain somewhat constant vacuum conditions during acceleration but, it may be more realistic to assume that the normal driver will accelerate at nearly constant throttle conditions instead of constant vacuum conditions.

It is therefore the principal object of this invention to provide a throttle motion indicator device for use with the internal combustion engine of an automotive vehicle which is operative to physically indicate to the vehicle operator the proper open position of the throttle to provide for minimum fuel consumption during acceleration of the vehicle.

Another object of this invention is to provide a throttle motion indicator device for providing a physical signal through the accelerator pedal linkage to the operator of a motor vehicle to alert him that he has reached the upper limit in acceleration rate to obtain good fuel economy.

A further object of this invention is to provide a throttle motion indicator device for use in an automotive vehicle that provides to the vehicle operator a slight stiffening in a throttle linkage to alert him that he has reached the upper limit of a predetermined throttle opening to provide an acceleration rate so as to obtain good fuel economy.

These and other objects of the invention are obtained by means of a throttle motion indicator device including a spring positioned roller secured to a throttle rod in position to engage a detent suitably positioned relative to the axial movement of the throttle rod to indicate a position indicative of a predetermined throttle setting that is desired for best fuel economy for a particular engine while maintaining the desired level of performance for the engine. A detent with one detent stop thereon can be used to indicate an upper limit in acceleration rate or, alternatively, a detent can be used which has two detent stops thereon which would indicate an optimum acceleration range to obtain good fuel economy.

For a better understanding of the invention, as well as other objects and further features thereof, reference is had to the following detailed description of the invention to be read in connection with the accompanying drawings, wherein.

Figure 1:
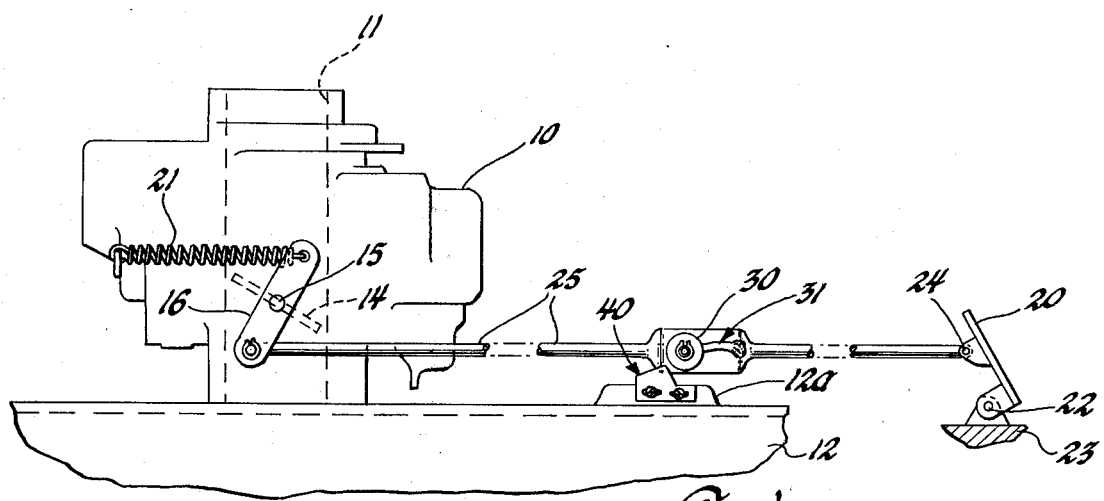
FIG. 1 is a schematic illustration of a portion of an internal combustion engine for a vehicle and the accelerator pedal linkage for the control thereof, a throttle motion indicator device, in accordance with the invention, being incorporated therewith, the detent of this indicator device being in accordance with a preferred embodiment thereof.

Referring first to FIG. 1, there is shown a portion of the internal combustion engine for a vehicle, the engine having a carburetor 10 providing an induction passage 11 in communication with the intake manifold 12 of the engine. A throttle 14, mounted on a throttle shaft 15, is pivotally disposed in the induction passage 11 and is controlled by a throttle lever 16 fixed to the shaft 15. Opening movement of the throttle 14 is effected by the usual driver actuated accelerator pedal 20 through a linkage to be described, while a throttle return spring 21 pivotably fixed to one end of the throttle lever 16 is used to effect closing movement of the throttle in a well known manner.

In the embodiment of the accelerator pedal linkage shown schematically in FIG. 1, the foot operated accelerator pedal 20 is pivotally mounted at one end at 22 to a vehicle body member 23 and the pedal 20 is also pivotally connected as at 24 to one end of the accelerator or throttle rod 25, the opposite end of the throttle rod 25 being pivotally connected to one end of the throttle lever 16.

The vehicle operator, in order to effect opening movement of the throttle 14, would effect pivotal movement of the accelerator pedal 20, in a counterclockwise direction with reference to FIG. 1, thereby moving the throttle rod 25 in an axial direction, to the left with reference to FIG. 1, whereby this throttle rod through its pivotal connection with the throttle lever 16 effects opening movement of the throttle. When pedal pressure is released, throttle return spring 21 will effect closing movement of the throttle and, through the throttle lever connection with the throttle rod, will effect axial movement of this rod in the opposite direction, that is, to the right with reference to FIG. 1.

Referring now to the throttle motion indicator device of the invention, this device includes a detent or cam follower 30 carried by a movable follower positioning element fixed to the throttle rod for movement therewith, the cam follower being normally positioned by the follower positioning element to releasably engage a fixed detent, generally designated 40, positioned parallel to the path of travel of the throttle rod. In the embodiment shown, the cam follower 30 is in the form of a roller hereinafter referred to as such, that is carried at one end of the movable positioning element which, in the embodiment illustrated, is a spring 31. The opposite end of the spring 31 is suitably retained on the throttle rod, the roller 30 thus being normally, movably positioned to engage the detent 40 during axial movement of the throttle rod.

Figure 2:
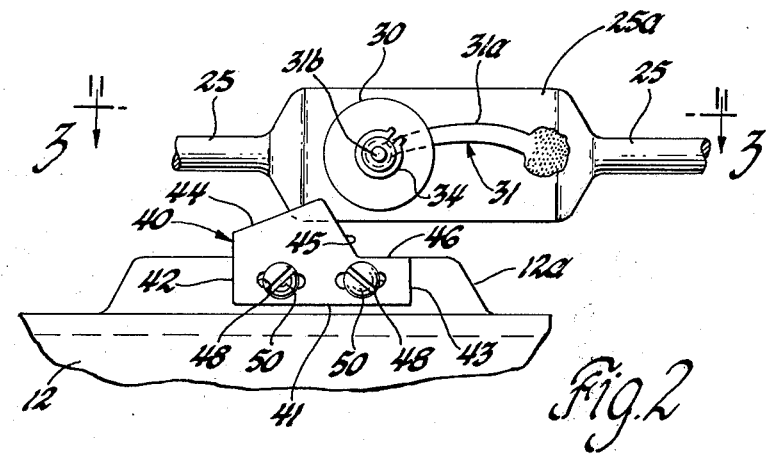
FIG. 2 is an enlarged view of a portion of FIG. 1 illustrating in detail the throttle motion indicator device of the invention in accordance with the preferred embodiment.

In the embodiment shown, spring 31, formed of spring wire, is provided with a pair of integral legs 31a and 31b, defining a somewhat L-shaped structure. The throttle rod 25, in the embodiment illustrated, is provided intermediate its ends with a flattened and enlarged portion 25a to which the free flattened end of the leg 31a of the spring 31 is suitably secured, as by a spot weld. As best seen in FIGS. 1 and 2, this leg 31a of the spring is curved in a downward extending arcuate path. The other leg 31b of spring 31 rotatably supports the roller 30, the roller being retained thereon between a radial flange 33 suitably fixed or formed on this leg inboard the free end thereof and a split ring retainer 34 positioned in an annular groove provided for this purpose adjacent to the free end of the leg 31b. With this arrangement, the roller 30 is positioned radially outward from the major body portion of the throttle rod 25 so that it can engage the detent 40 which can be mounted in a position so as to not interfere with the axial movement of the throttle rod per se.

Figure 3:
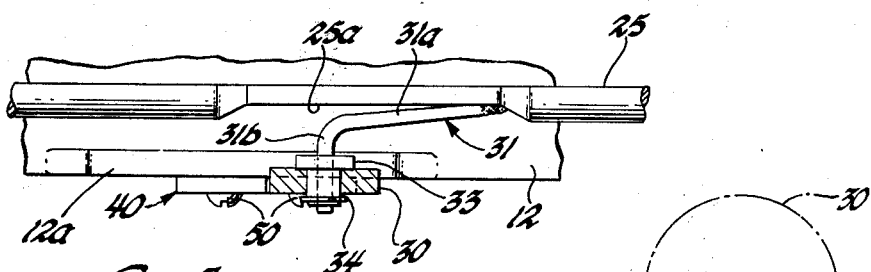
FIG. 3 is a view taken along line 3—3 of FIG. 2.

The detent 40, in the embodiment illustrated in FIGS. 1, 2 and 3, is in the form of a flat plate having a bottom edge 41, spaced apart parallel side edges 42 and 43 and a stepped upper edge which includes a gradually inclined trailing edge or cam ramp edge 44 extending from side edge 42 to a reversely and steeply inclined detent edge 45 which itself extends to an upper edge 46 that extends parallel with the bottom edge 41 to join the side edge 43. The detent edge 45 is in effect the leading or forward edge of detent 40 while cam ramp edge 44 would be the trailing or rear edge of the detent in terms of the direction of travel of cam follower 30, when the throttle rod is moved in a throttle opening direction. The detent 40 is mounted in a predetermined position, on a suitable fixed support, such as the machined side surface of boss 12a provided for this purpose on the intake manifold 12, whereby the detent is positioned parallel to the path of travel of the throttle rod and to the cam follower carried thereby for engagement by the cam follower. The detent is retained as by machine screws 50 extending through elongated slots 48 in the detent plate for threaded engagement in the boss 12a whereby the detent can be adjustably positioned.

In operation, as the driver depresses the accelerator pedal 20, against the biasing action of throttle return spring 21, to move the throttle rod in a throttle opening direction, to the left with reference to FIGS. 1 and 2, the throttle rod is free to move axially until the follower 30 carried thereon engages the detent edge 45 of detent 40, this detent edge 45 being inclined at a suitably steep angle to, in effect, provide an abutment or detent stop against which the cam follower or roller 30 engages. However, there is sufficient slope to this detent edge 45 so that upon the application of additional force by the operator on the accelerator pedal, he can move the throttle rod in the throttle opening direction to cause the cam follower or roller 30 to ride up the detent edge 45 causing the spring 31 to flex in a direction, clockwise with reference to these figures, until the cam follower 30 rides up and over the detent edge. After this, the force of spring 21 is the only force that the operator must then overcome, as conventional, to effect further opening of the throttle 14. Thus, at any time, if desired, the operator can easily override the detent stop.

The slope or rise of the cam ramp edge 44 of the detent 40, on the other hand, is such so as to permit the cam follower 30 to easily ride up over this edge through flexing of the spring 31 as the throttle rod 25 is biased in a throttle closing direction, to the right with reference to these figures, by the throttle return spring 21 upon the release of pedal pressure by the operator on the accelerator pedal.

Depending on the location of the cam follower 30 on the throttle rod, the detent 40 is positioned relative thereto so that the throttle rod 25 will move a predetermined axial distance, corresponding to a predetermined pivotal opening movement of the throttle 14, before the cam follower 30 first engages the detent edge 45. For example, the detent 40 can be positioned to provide a signal to the driver that a 20 percent throttle opening has been obtained, such a predetermined throttle opening being such so as to provide for good fuel economy during acceleration, while providing adequate acceleration of the vehicle. Of course, it should be realized that the actual percentage of throttle opening at which the detent should be positioned must be predetermined for each vehicle engine, since the desired throttle opening to obtain the desired fuel economy while providing the desired acceleration will depend upon various factors, such as the horsepower of the engine, vehicle weight, and the axial ratio and type of transmission used in a particular vehicle. The percentage throttle opening position, assuming a hot engine, should be such as to provide improved fuel economy, with a general operating range of say six to ten inches of mercury vacuum in the intake manifold and this throttle opening position also should be such so as to permit suitable acceleration of the vehicle to permit the vehicle to keep up with traffic in all driving situations.

Figure 4:
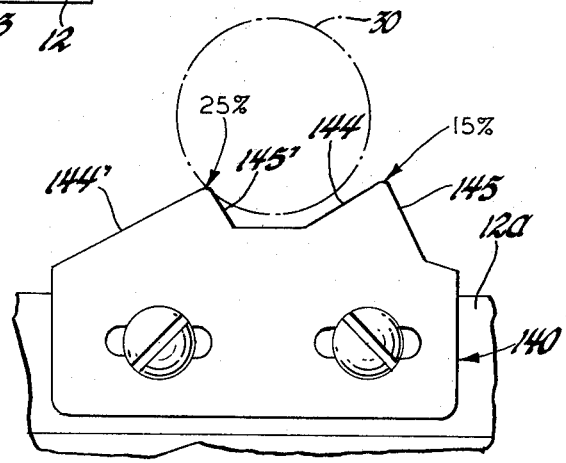
FIG. 4 is a view of an alternate embodiment of a detent structure for use in the throttle motion indicator device of the invention.

The detent 40, shown in FIGS. 1, 2 and 3, can thus be used to provide a signal, in the manner described, informing the driver of when he is operating at a close-to-optimum acceleration by providing a single detent stop for a predetermined throttle opening position, such as, for example, a 20 percent throttle open position, or an alternate embodiment of a detent, generally designated 140, illustrated in FIG. 4, can be used to provide a pair of signals to inform the driver when he is operating within an optimum acceleration range, the detent 140 providing a pair of detent stops for two predetermined throttle opening positions, for example, 15 percent and 25 percent throttle opening levels.

For this purpose, the detent 140, shown in FIG. 4, is provided with a pair of detent stops to indicate the above 15 percent and 25 percent throttle openings, these throttle positions being used by way of example only. Thus, the detent 140, similar in construction to the detent 40, is provided with a first detent edge 145 at the front of the detent, with reference to the edge first engaged by the cam follower 30 during movement of the throttle rod in a direction to effect opening movement of the throttle 14 and a second detent edge 145' spaced rearwardly of the first detent edge, the first detent edge 145 joining a gradually inclined first cam ramp edge 144, and the second detent edge 145' extending to a gradually inclined second cam ramp edge 144'.

With this detent 140 arrangement, during acceleration the vehicle operator would effect operation of the accelerator pedal in such a manner so as to have the cam follower 30 first engage the detent edge 145 at which time the operator would then apply sufficient additional pedal force to cause the cam follower 30 to ride up over this detent edge 145. Thereafter, the operator would be readily able to ascertain when he is operating the vehicle between a 15 percent and 25 percent throttle opening, since as he approached the 25 percent open throttle position, the cam follower 30 would engage the second detent edge 145' providing an indication to the operator that he should not attempt to override this detent if he wishes to continue operating the vehicle within a range of 15 percent and 25 percent throttle opening. It should also be realized that such a range of throttle openings can also be obtained by the use of two appropriately spaced detents 40 in lieu of the detent 140 with the two detent stops thereon.

In selecting a throttle opening position or a throttle opening range, with the corresponding positioning of a detent stop or stops, such as detent 40 and detent 140, on the fixed support 12a, required normal load throttle openings should be taken into consideration for a particular engine-vehicle combination so that these throttle openings are not below the detent stop range so that the detent will not interfere with pedal feel under normal conditions.

The subject throttle motion indicator device, as disclosed, is thus usable not only by the previously described driver but can also be used by a normal driver to indicate to him a proper predetermined position or range of positions of the throttle to provide for improved fuel economy during acceleration.

What is claimed is:

1. A throttle motion indicator device for an internal combustion engine having an induction system including a movable throttle for controlling flow through an induction passage and a manually actuated throttle control means, including an axial movable throttle rod, operatively connected to the throttle to effect opening movement of the throttle, said throttle motion indicator device including a leaf spring member having one end secured to the control rod for movement therewith, a detent follower secured to the opposite end of said leaf spring member, and a detent stop means adjustably fixed with respect to the engine in the path of travel of said detent follower, said detent stop means being positioned to be engaged by said detent follower upon operation of the throttle control rod effecting a predetermined opening movement of the throttle.

2. A throttle motion indicator device according to claim 1 wherein said detent stop means has a steeply inclined detent edge on the leading edge thereof defining a releasable stop for said cam follower during movement of the throttle rod in a throttle opening direction and, a reversely and gradually inclined cam ramp on the trailing edge thereof, said cam ramp edge extending to the top of said detent edge.

3. A throttle motion indicator device according to claim 1 wherein said detent stop means has in sequence a steeply inclined first detent edge on the leading edge thereof defining a first stop for said cam roller during movement of the throttle rod in a throttle opening direction, said first detent edge joining a reversely and gradually inclined first cam ramp edge, and a steeply inclined second detent edge defining a second stop for said cam follower, said second detent edge joining a reversely and gradually inclined second cam ramp edge, said first detent edge and said second detent edge being spaced a predetermined distance apart for sequential engagement by said detent follower upon operation of the throttle rod in a throttle opening direction effecting a first predetermined opening movement of the throttle and a second predetermined opening movement of the throttle.

4. A throttle motion indicator device for an internal combustion engine having an induction system including a throttle movable between a closed position and a fully open position for controlling flow through an induction passage, a spring means operatively connected to the throttle for normally biasing the throttle to the closed position and, a manually actuated throttle control means, including an axial movable throttle rod, operatively connected to the throttle to effect movement of the throttle toward the fully open position, said throttle motion indicator device including a detent stop means fixed relative to the engine adjacent to the path of movement of the throttle rod, a cam follower, and a movable follower positioning means operatively connected to the throttle rod for movement therewith and supporting said cam follower, said detent stop means has a steeply inclined detent edge on the leading edge thereof defining a detent stop for said cam follower during movement of the throttle rod in a throttle opening direction and, a reversely and gradually inclined cam ramp edge on the trailing edge thereof, said cam ramp edge extending to the top of said detent edge, said cam follower being movably supported by said movable follower positioning means normally in a position to engage said detent stop upon a predetermined movement of the throttle rod in a throttle opening direction corresponding to a predetermined throttle opening position and upon further movement of the throttle rod in a further throttle opening direction, said movable follower positioning means will permit said cam follower to ride up said detent edge for disengagement from said detent stop.

5. A throttle motion indicator device for an internal combustion engine having an induction system including a throttle movable between a closed position and a fully open position for controlling flow through an induction passage, a spring means operatively connected to the throttle for normally biasing the throttle to the closed position and, a manually actuated throttle control means, including an axial movable throttle rod, operatively connected to the throttle to effect movement of the throttle toward the fully open position, said throttle motion indicator device including a detent stop means fixed relative to the engine adjacent to the path of movement of the throttle rod, a cam follower, and a movable follower positioning means operatively connected to the throttle rod for movement therewith and movably supporting said cam follower, said cam follower being supported by said movable follower positioning means normally in a position to releasably engage said detent stop means, said detent stop means having in sequence a steeply inclined first detent edge on the leading edge thereof defining a first stop for said cam roller during movement of the throttle rod in a throttle opening direction, said first detent edge joining a reversely and gradually inclined first cam ramp edge, and a steeply inclined second detent edge defining a second stop for said cam follower, said second detent edge joining a reversely and gradually inclined second cam ramp edge, said first detent edge and said second detent edge being spaced a predetermined distance apart for sequential engagement by said detent follower upon operation of the throttle rod in a throttle opening direction effecting a first predetermined opening movement of the throttle and a second predetermined opening movement of the throttle.

6. In a vehicle having an internal combustion engine with an induction system including a throttle movable between a closed position and a fully open position for controlling flow through an induction passage, a spring means operatively connected to the throttle to normally bias the throttle to the closed position and, a manually actuated throttle control means, including an axial movable throttle rod, operatively connected to the throttle to effect movement of the throttle from the closed position toward the fully open position, a throttle motion indicator device including a cam follower, a movable positioning element supporting said cam follower at one end thereof with the opposite end of said movable positioning element operatively connected to the throttle rod for movement therewith and, a detent stop means fixed relative to the engine adjacent to the path of movement of the throttle rod and in position to be engaged by said cam follower during throttle opening movement of the throttle rod effecting a predetermined opening movement of the throttle.

* * * * *

UNITED STATES PATENT OFFICE
CERTIFICATE OF CORRECTION

Patent No. 3,977,371                    Dated August 31, 1976

Inventor(s)   Harry R. Mitchell et al.

It is certified that error appears in the above-identified patent and that said Letters Patent are hereby corrected as shown below:

Column 5, line 60, after "ramp", first occurrence, insert -- edge --.

Signed and Sealed this

Twenty-fifth Day of January 1977

[SEAL]

Attest:

RUTH C. MASON
Attesting Officer

C. MARSHALL DANN
Commissioner of Patents and Trademarks